United States Patent [19]

Chu

[11] 4,313,901
[45] Feb. 2, 1982

[54] ISOTHERMAL TRANSFER MOLDING
[75] Inventor: Edward J. Chu, Parsippany, N.J.
[73] Assignee: Resistoflex Corporation, Roseland, N.J.
[21] Appl. No.: 694,779
[22] Filed: Jun. 10, 1976
[51] Int. Cl.³ .............................................. B29G 1/10
[52] U.S. Cl. ................... 264/127; 264/269; 264/327; 264/328.16; 264/328.19
[58] Field of Search ............. 264/297, 325, 329, 328, 264/127, 327, 269, 328.16, 328.19

[56] References Cited
U.S. PATENT DOCUMENTS

| | | | |
|---|---|---|---|
| 1,935,794 | 11/1933 | Geyer | 264/297 |
| 2,080,783 | 5/1937 | Petersen | 264/297 |
| 2,287,277 | 6/1942 | Ryder | 264/329 X |
| 2,617,152 | 11/1952 | Rubin | 264/329 X |
| 3,776,998 | 12/1973 | Church | 264/329 X |

FOREIGN PATENT DOCUMENTS

160114 12/1954 Australia .............. 264/329
661166 11/1951 United Kingdom ............ 264/329

Primary Examiner—Thomas P. Pavelko
Attorney, Agent, or Firm—Hopgood, Calimafde, Kalil, Blaustein & Judlowe

[57] ABSTRACT

Transfer molding of polypropylene, polyvinylidene fluoride, FEP fluorocarbon resin or PFA fluorocarbon resin to produce a lining for a 6" tee pipe fitting is accomplished isothermally by applying pressure of the order of 200 psi to the material while the material, the charge holding chamber and the tee mold are secured in a fixture in an oven. Transfer is performed at a stabilized resin temperature of the order of 375° F. for polypropylene, 450° F. for polyvinylidene fluoride, and 640° F. for FEP and PFA resins over a relatively long time interval. Pressure is removed, the mold assembly is transferred to a press outside the oven, pressure of the order of 700 psi is reapplied to the material, and the mold is force cooled progressively from a remote point back toward the gate which is located in the fitting opposite the stack section thereof.

2 Claims, 9 Drawing Figures

Fig. 1.

ISOTHERMAL TRANSFER MOLDING

The present invention relates to transfer molding and, more particularly to transfer molding of thermoplastic material.

While the invention to be described is particularly useful in transfer molding of any thermoplastic material which is subject to thermal degradation, it is especially advantageous in handling PFA and FEP fluorocarbon resins, as well as polyvinylidene fluoride and polypropylene. Because the most dramatic results are achieved therewith, the invention will be described with reference to a particular example in which FEP fluorocarbon resin is used to provide a liner for a tee pipe fitting.

E. I. Du Pont de Nemours & Co. (Inc.) of Wilmington, De., manufacturer of PFA and FEP fluorocarbon resins, describes techniques for transfer molding of such resins in its preliminary information bulletin PIB No. 36 (Revised) dated August 1973. Said bulletin describes the use of transfer molding to provide a 2-inch tee with a lining of the stated thermoplastic. The tee body is fitted with mandrels and flange plates to direct and confine the flow of melted resin. As so provided, the fitting serves as the mold in an in situ molding process. Transfer molding is accomplished by forcing the resin from a melt pot consisting of a sleeve, pusher and nozzle directly into the stack of the tee housing.

The process described in the Du Pont bulletin specifies that for lining a 2-inch tee the mold should be placed in an oven and heated to a temperature which for FEP is in the range of 630° to 660° F. (332.22° to 348.89° C.), while for PFA it is in the range of 650° to 710° F. (343.33° to 376.67° C.). Concurrently, the resin should be melted directly in the melt pot sitting in a circulating air oven and brought to a temperature within the same respective range. When the mold is up to temperature and the resin has melted, the heated mold is removed from the oven and placed on the lower platen of a press. About two minutes is stated to be required for this operation. The melt pot (minus pusher) is removed from the oven and placed on top of the mold. The pusher which is cold is then inserted in the melt pot and the press activated. According to the Du Pont bulletin the cold pusher freezes a skin of melt directly under it preventing flashing up around the pusher as the pressure builds up during transfer. Normal pressures of PFA and FEP fluorocarbon resins are stated to be in the 1,000 to 4,000 psi (70.307 to 281.228 Kg/cm$^2$) range with 1,000 to 2,000 psi (70.307 to 140.614 Kg/cm$^2$) recommended. With the example discussed, the Du Pont bulletin states that approximately two minutes are required to fill the mold transferring approximately ½ pound (0.2268 Kg) of material per minute. Once the mold is filled, it must be cooled carefully while being maintained under pressure, cooling being accomplished at a controlled rate from a remote point of the mold towards the gate.

FEP resin is a difficult resin to process. It has relatively high viscosity in the melt state and, according to the Du Pont literature, is characterized by a relatively low critical shear rate which sets the maximum rate at which the material can be transferred through a gate of given diameter. For "Teflon" 160 FEP resin the critical shear rate is given as 4 sec$^{-1}$ at 650° F. (343.33° C.). While the critical shear rate of the resin can be increased by raising the melt temperature, FEP resin is also subject to appreciable degradation at temperatures much above 640° F. (337.78° C.). For example, the Du Pont bulletin specifies that at 680° F. (360.00° C.) the melt flow number of the resin, determined by the procedures specified in ASTM D2116-66, will increase by 10% in 30 minutes. The melt flow number as set forth therein is expressed in terms of the amount of flow in grams per 10 minutes at a constant temperature and pressure through an orifice 0.0824 inches (0.2093 cm.) in diameter.

Considering the foregoing data, it should be apparent that when processing FEP resin, the temperature of the resin must be maintained within a narrow range during the entire operation of transferring from the melt pot to the mold. If the temperature rises above a critical level for any significant period of time the resin will degrade. If the temperature drops below a critical level the critical shear rate will fall resulting in shearing defects or melt fracture as the resin is forced through the gate and through the cavity of the mold. So long as the mold can be filled with sufficient speed, the process described in the aforesaid Du Pont bulletin is satisfactory. However, it has been found that the process is unsatisfactory when an attempt is made to line larger molds since the transfer rate cannot be increased significantly and this causes the transfer time to increase excessively. That is, the mold cools below the critical temperature while it is in the press and during the transfer operation.

With the foregoing in mind, the present invention completely eliminates the time restriction as well as the limitation on size of mold that can be handled. In essence, the invention resides in transferring the resin to the mold isothermally. Many advantages result from the isothermal approach.

Simply stated, the present invention accomplishes the transfer operation within a hot air oven rather than in ambient air. In this way, the temperature can be maintained at an optimum value within narrow limits such that the resin can be transferred to the mold under low pressures over a lengthy period of time with various additional advantages. The mold cores can be made light and hollow facilitating the cooling operation. The temperature can be maintained below that temperature which causes any degradation of the resin such that the melt flow number remains virtually unchanged during the entire process. Because of the low pressures, there is no danger of distorting the mold or shifting the cores. In addition, the low pressure simplifies the sealing problem resulting in minimum or negligible flash. Finally, by maintaining flow rates at a minimum the chance of producing melt fracture becomes minimal. As an example, the process in accordance with the present invention was used to line 6-inch tee fittings with FEP resin. Sixty-four such fittings were lined in succession in a pilot run without a single flaw, an achievement unable to be obtained with any other known process for this size.

In accordance with the present invention, the process of producing an article by transfer molding a thermoplastic material wherein the material in a heated condition is transferred by the application of pressure thereto from a charge holding chamber to an interconnected mold is characterized by the fact that heat is applied to said chamber and said mold so as to maintain both at a substantially constant temperature above the melting point of the material while the material in a melt state is transferred from the chamber to the mold. Another characteristic of the subject invention is that the transfer pressure on the material is maintained below that heretofore required, i.e., below about 500 psi 35.153 Kg/cm²). and preferably within the range of 190 to 230 psi 13.359 to 16.171 Kg/cm²).

The invention will be better understood after reading the following detailed description of the presently preferred embodiment thereof with reference to the appended drawings in which:

FIG. 2 is a sectional view taken along line 2—2 in FIG. 1;

The same reference characters are used throughout the drawings to designate the same or similar parts and reference should now be had thereto.

In preparation for the molding operation involving a 6-inch tee pipe fitting, all of the surfaces of the various parts which will contact resin are lubricated in known manner. The fitting 10, best seen in FIG. 7, having through legs 11 and 12 and a stack 13, is provided with a threaded port at 14 opposite the stack 13. An externally threaded sprue bushing 15 is installed in the threaded port 14, as shown. The bore 16 through the bushing 15 functions as the gate to the mold. The bushing also provides clearance between the sprue and the tee fitting after molding to accommodate a threaded pipe plug for closing the port 14.

Figure 7:
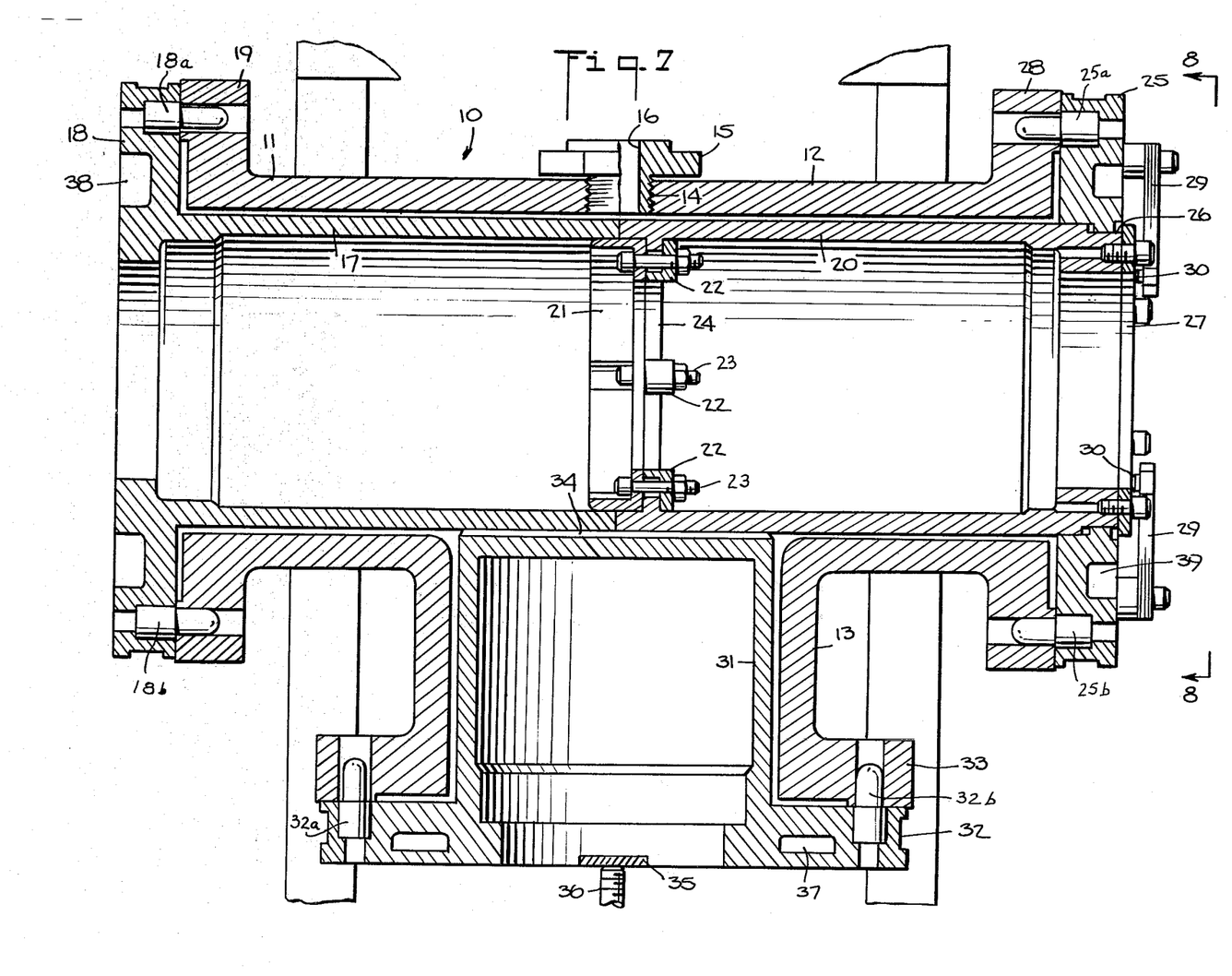
FIG. 7 is a sectional view taken along line 7—7 in FIG. 1.
Figure 8:
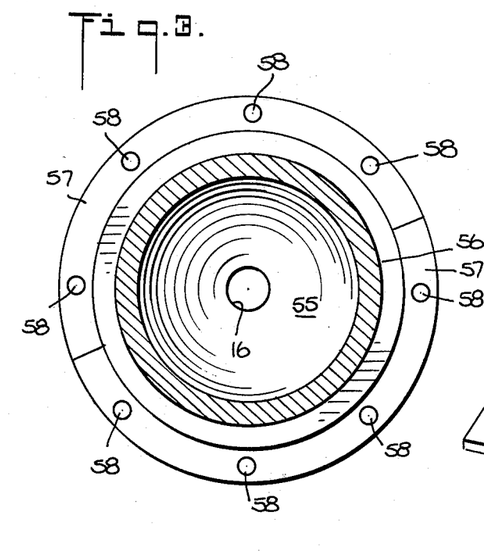
FIG. 8 is a sectional view taken along line 8—8 in FIG. 7.

A core or mandrel through the straight run of the tee is provided by a stationary core section 17 which extends from a flange 18 to the mid-point of the tee. As shown, the core 17 is provided with pilot pins 18a and 18b which make a close fit with holes drilled at diametrically opposed points in the flange 19 of the tee fitting. The holes in flange 19 for the pilot pins should be located between the usual bolt holes in the flange 19 which receive suitable bolts or threaded studs extending therethrough for the flange 18 for fastening by suitable nuts.

A sliding core section 20 has a pilot ring 21 secured by four equally spaced clamps 22 and fasteners 23 to an internal shoulder 24 at one end thereof. An end plate 25 is slidingly mounted on a reduced diameter portion of the core section 20 at the opposite end thereof at 26 and retained on the said core 20 by an end plate retainer 27 bolted to the end of the core. The end plate retainer 27 is in the form of a flat ring. End plate 25 is secured by bolts or threaded studs to the flange 28 of the tee fitting and located by pilot pins 25a and 25b, as shown.

Figure 6:
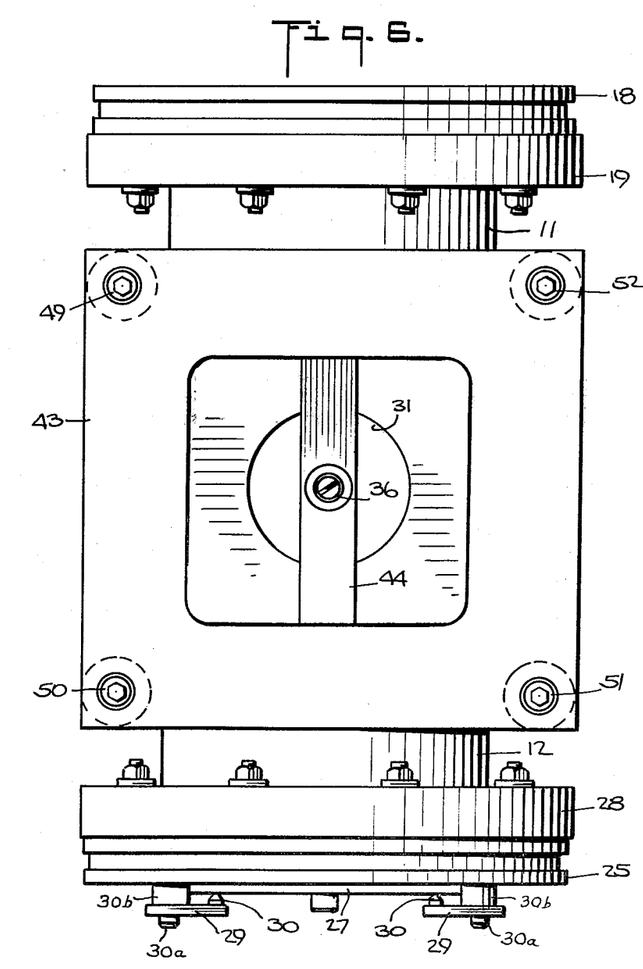
FIG. 6 is a sectional view taken along line 6—6 in FIG. 1.

The purpose of the sliding arrangement between the end plate 25 and the core section 20 is to accommodate the core to variations in tolerance of the castings that constitute the tee fitting. The core section 20 is maintained in contact with the core section 17 by a set of four equally spaced end clamps 29, two of which are seen in FIG. 7. The end clamp takes the form of a flat bar having a threaded aperture at one end carrying a set screw 30 which can be urged against the retainer 27 while the opposite end of the clamp 29 is apertured to provide for mounting, as best seen in FIG. 6, on the end plate 25 with suitable bolts 30a. Washers 30b maintain the clamp 29 spaced from the plate 25.

The fitting stack 13 is provided with a stack core 31 secured by a core flange 32 to the flange 33 of the stack. Location of the flange 32 relative to the flange 33 is accomplished with the aid of pilot pins 32a and 32b. The stack core 31 is cup shaped with the bottom of the cup cylindrical to conform in spaced relationship to the cylindrical surface of the core sections 17 and 20. The radius of curvature of the outer surface of the cylindrical bottom section 34 of the stack core should be selected and located such that the surface substantially coincides with the I.D. of the legs 11 and 12 of the tee fitting. As a consequence of this arrangement of through core and stack core, the molded lining will have a diaphragm portion isolating the stack section from the through or straight run section. This diaphragm is severed and removed after the molding operation and removal of the cores.

The purpose of the various pilot pins 18a, 18b, 25a, 25b, 32a, and 32b is to ensure proper concentricity between the tee housing and the several core parts of the mold.

Still referring to FIG. 7, a bar spring member 35 is interposed, in a manner that will be better understood after reading the remainder of the present description, between a bolt 36 and the end of the stack core 31.

Figure 5:
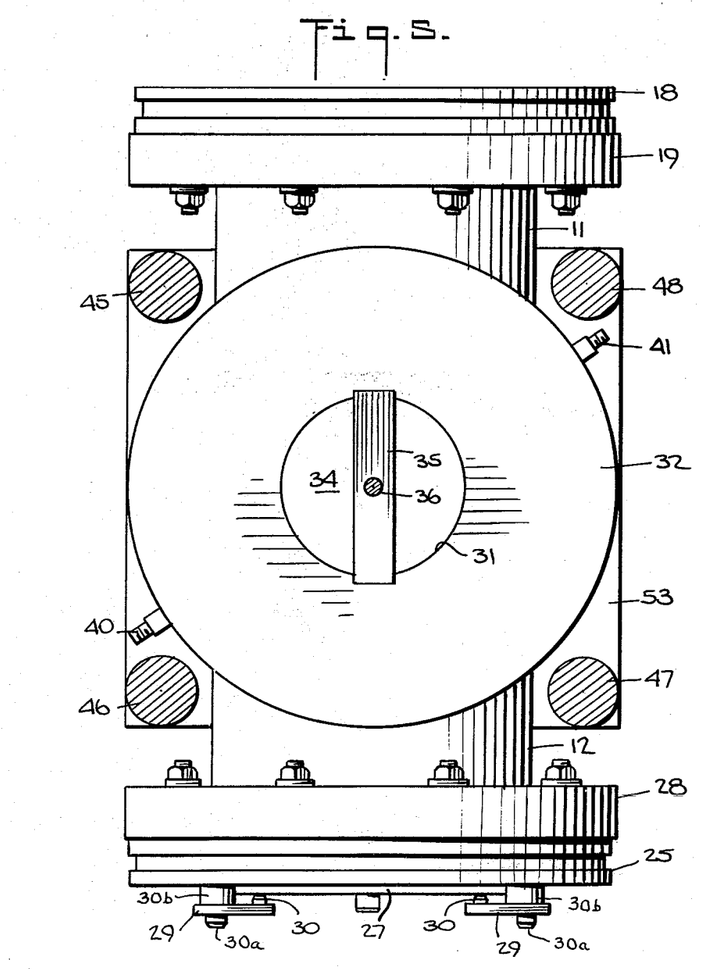
FIG. 5 is a sectional view taken along line 5—5 in FIG. 1.

The core flange 32 is provided with an annular cavity 37. Nipple fittings 40 and 41 are mounted at diametrically opposed positions on the flange 32 and communicate with the cavity 37. These are best seen in FIG. 5. Core flange 18 and end plate 25 may be provided with channels 38 and 39, respectively, for lightening the parts.

Figure 1:
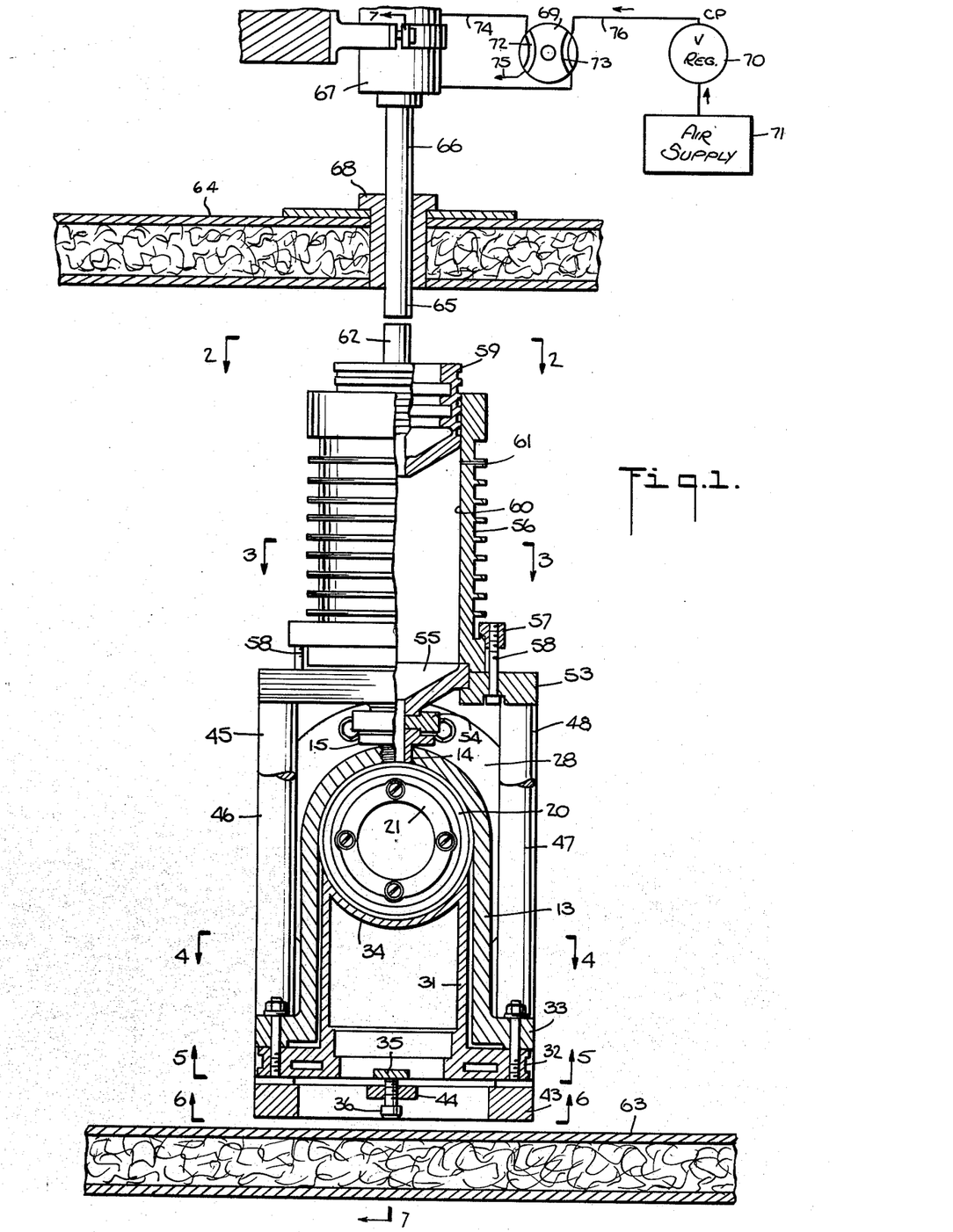
FIG. 1 is an elevational view partly in section and partly broken away showing a tee assembly mounted in a frame and joined to a charge holding chamber within an oven for the purpose of illustrating an embodiment of the invention.
Figures 3, 4:
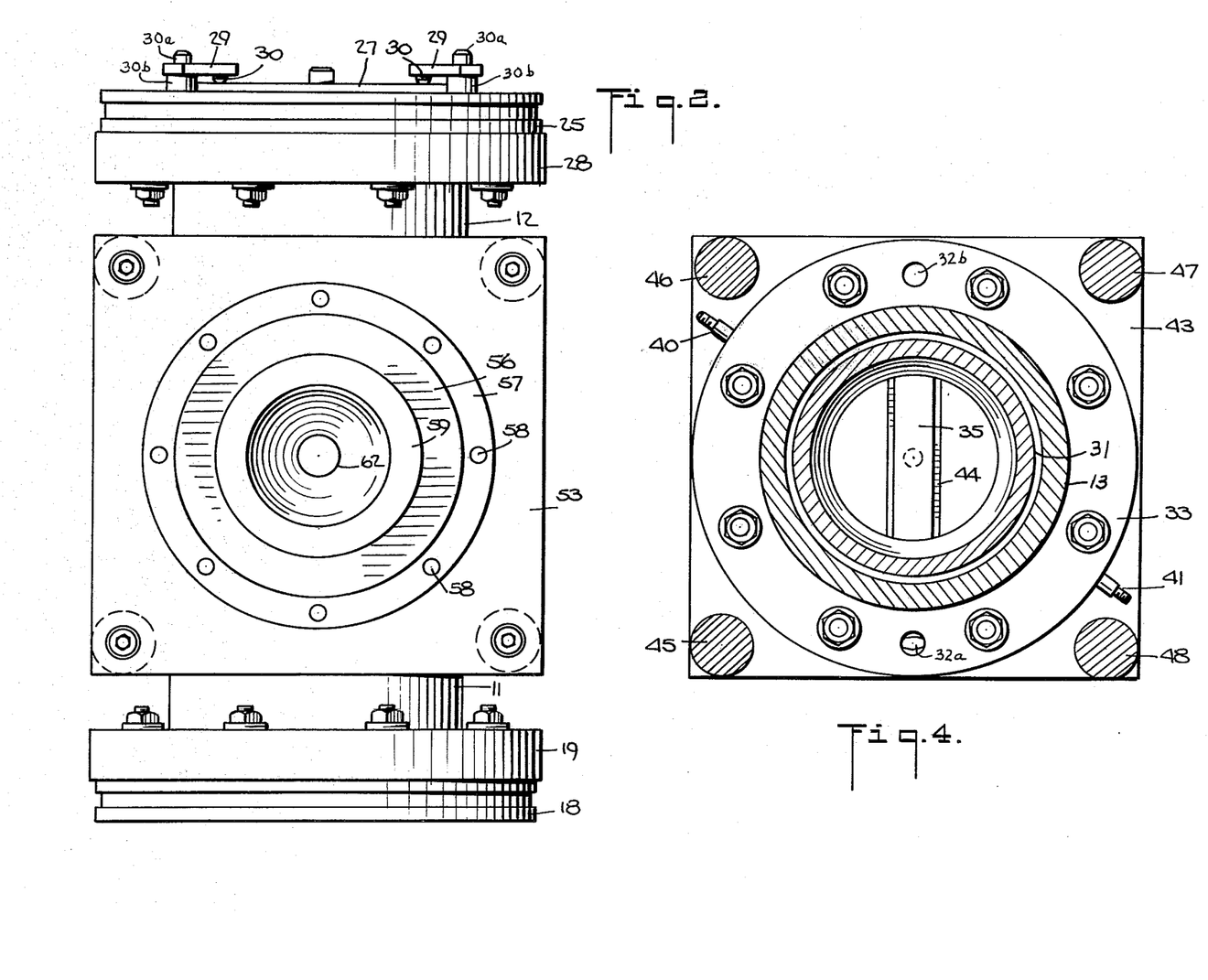
FIG. 3 is a sectional view taken along line 3—3 in FIG. 1.
FIG. 4 is a sectional view taken along line 4—4 in FIG. 1.

Having completed the assembly as best seen in FIG. 7, the mold with its core elements installed is placed in a frame or fixture best seen in FIG. 1. The fixture consists of a base plate 43 which, as best seen in FIG. 6, consists of a rectangular frame portion and a cross strap 44. The strap 44 has reduced thickness providing a relief on its underside to accommodate the bolt 36 threadedly installed therein, as shown. The four corners of the base plate 43 support columns 45, 46, 47 and 48 which, as best seen in FIG. 6, are fastened thereto by corresponding bolts or cap screws set in appropriate recesses 49, 50, 51 and 52. A top plate 53 is fastened at its corners to the tops of the columns 45, 46, 47 and 48 with suitable bolts or cap screws.

With the bolt 36 retracted and the top plate 53 removed, the mold is placed in position resting on the bottom plate 43. The top plate 53, a split adaptor ring 54 and a conical die or nozzle 55 are then assembled with the plate 53 being bolted in place, the adaptor ring 54 interfitted on the sprue bushing 15, and the nozzle 55 passing through a central opening in the top plate 53 and nesting in a counterbore therein with its lower end interfitted in the split adaptor ring 54.

A pot or chamber 56 for holding the resin charge is mounted over the die 55 resting on the upper edge thereof where it is secured by a split clamping ring 57 and a plurality of bolts 58 to the top plate 53. The engaging surfaces between the ring 57 and the pot 56 are preferably frusto-conical to ensure centering of the parts. At this time, the bolt 36 should be advanced to exert pressure against the bar spring 35 until the mold assembly is raised eliminating all clearances and establishing a tight fit between the sprue bushing 15, the split ring adaptor 54 and the bottom of the die 55. Failure to establish this snug fit will result in resin leaking between the parts as soon as pressure is applied thereto. The spring 35 compensates for dimensional changes during temperature cycling.

The remaining apparatus shown in FIG. 1 consists of a ram 59 which makes a snug fit with the bore 60 of the chamber 56. Just below the lower end of the ram near the upper end of the chamber is a vent aperture 61 for a reason to be described below. The ram 59 is provided with a central pusher rod 62 which, when the entire assembly is properly located within the hot air oven whose bottom and top walls are represented at 63 and 64, respectively, is engageable by lower end 65 of a connecting rod 66 projecting from a pneumatic cylinder 67. The connecting rod 66 passes through a bushing 68 in the wall 64 of the oven.

As shown schematically in FIG. 1, the cylinder 67 is mounted in fixed position above the top oven wall 64 and connected through a selector valve 69 and a pressure regulator valve 70 to a source of compressed air 71. The selector valve 69 has two passages 72 and 73 therethrough. In the position shown in FIG. 1 passage 72 connects line 74 from the upper end of the cylinder 67 to an exhaust port 75. Valve passage 73 connects the output line 76 from the pressure regulator to line 77 feeding the lower end of the cylinder 67. When valve 69 is rotated 90° in either direction, the passages 72 and 73 will interconnect pressure line 76 with cylinder line 74 and cylinder line 77 with exhaust port 75. It should be obvious that this provides for moving the piston of cylinder 67 up and down as required.

The operating temperature rating of the pneumatic cylinder 67 and the length of the connecting rod 66 should be such that the ambient temperature rating of the cylinder 67 is not exceeded as a result of heat from the oven being conducted thereto via the connecting rod 66. In a pilot arrangement that has proven satisfactory a high temperature environment cylinder has been used having a connecting rod of sufficient length to space the cylinder from the bushing 68 by a distance of about one foot or more. With the oven at operating temperature for extended periods of time, the connecting rod 66 at a point adjacent the cylinder never gets too hot to touch with the bare hand.

At the beginning of a molding operation the tee fitting mold with cores installed and mounted in the fixture as previously described and as shown in FIG. 1 is installed in the oven. At this time ram 59 is not installed in chamber 56 and is located elsewhere in the oven. At the same time a tray 78, shown in FIG. 9, supporting a plurality of cylindrical forms 79 is placed in the oven with the cylindrical forms loaded with the proper quantity of resin. The resin may be virgin granules or scrap in the form of chunks, random cut pieces, or the like, or combination thereof. The desired quantity of material is generally determined by weight after initial calculation and empirical testing.

With the oven charged as described above and using either FEP or PFA resin the oven is brought up to temperature or may previously have been brought up to temperature which for the selected resin is preferably about 10° F. (5.56° C.) above 640° F. (337.78° C.). In choosing the temperature for FEP resin it must be maintained below that which will cause the resin to exceed the degradation level while high enough for good working viscosity. Good results can be obtained when the resin temperature is raised to between 620° and 660° F. (326.67° and 348.89° C.) but the range of 630° to 650° F. (332.22° to 343.33° C.) is preferred while 640° F. (337.78° C.) is believed, at present, to be optimum.

With PFA resin good results can be obtained with a resin temperature between 630° F. (332.22° C.) and somewhat in excess of 700° F. (371.11° C.). However, it is presently preferred to keep the temperature within the range of 630° to 650° F., the same range suitable for FEP resin. A higher temperature should be avoided because it creates problems during the cooling steps. That is, it is difficult to balance the cooling and obtain progressive cooling of material which is essential to avoid voids and internal defects. As with FEP resin, extremely good results are obtained at a resin temperature of 640° F., a fact that renders simultaneous processing of PFA and FEP possible.

Figure 9:
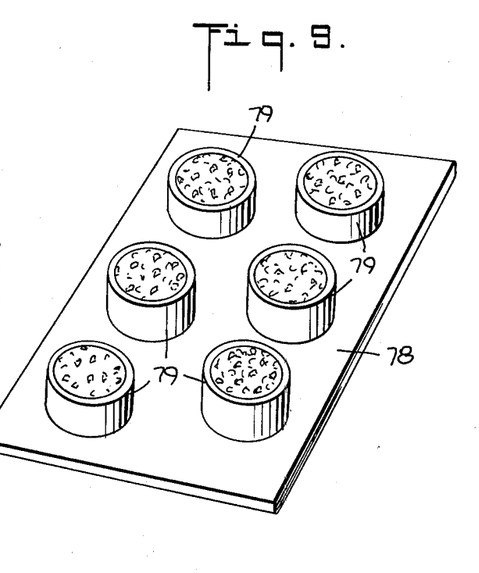
FIG. 9 is a view of the containers used when melting the resin.

After about three hours in the oven, it has been found that all of the resin will have melted and united within each cylindrical form into a homogeneous mass and all of the metal parts of the mold and chamber will have stabilized at the working temperature. It has also been found that volatilizable contaminants in scrap material charged into the forms 79 are eliminated by volatilization during the heating step in the open containers. Experience with PFA scrap, unpigmented, where visible contamination is obvious, has been excellent. In some cases, the resultant molding as viewed by the naked eye appeared less contaminated than the original scrap chunks of material.

With the material all at proper temperature the oven is open and the entire fixture removed along with the charges of resin. These are then introduced one by one into the bore 60 of the chamber 56, tamped down with a tamper and surmounted by the ram 59. The top of the bore 60 is provided with a shallow counterbore to receive and center the form 79 while the charge is introduced. The vent aperture 61 is located between the upper level of the charge and the top of the chamber 56 to bleed off air as the ram is inserted. This provides for rapid insertion of the ram and avoids trapping air therebetween.

With the charge installed, the entire assembly is returned to the oven to the position shown in FIG. 1. The oven is closed and the valve 69 is manipulated to apply pressure to the upper end of cylinder 67. The pressure regulator valve in test operations has been adjusted to provide a constant pressure of 500 psig (35.154 Kg/cm² gauge) on the piston in the cylinder 67. With the particular pilot arrangement that has been tested it has been calculated that the pressure on the material is approximately 211 psi (14.835 Kg/cm²). This pressure is maintained constant by the operation of the pressure regulator in known manner.

In test operations using a mold requiring approximately 2800 grams of FEP resin, corrected to room temperature, to fill the same, the filling operation has taken between 30 and 40 minutes. This time could be reduced somewhat by increasing the fill pressure which must be sufficient to completely fill the mold; however, increasing the pressure beyond a critical value for the mold size and geometry will cause mold distortion, leakage and sealing problems, as well as excess flow rates causing melt fracture.

Observation of the movement of the connecting rod 66 by a suitable gauge, not shown, will afford an indication of the progress of the resin transfer step. When travel of the connecting rod 66 has ceased, a short additional interval should be allowed to ensure stabilization of the system. An interval of 5 minutes should normally be sufficient. At the end of such interval the valve 69 may be manipulated to reverse the travel of the cylinder 67 withdrawing the connecting rod 66.

The next step is to remove the entire molding assembly and fixture from the oven and place it in a press for reapplying pressure to the ram 59. Because of the comparatively low transfer pressure applied to the resin there is negligible tendency for the resin to expand when pressure is released from the ram 59 during the interval of transfer from the oven to the press. This must be distinguished from prior methods wherein pressures in excess of 1000 psi (70.307 Kg/cm$^2$) were applied directly to the plastic material.

In the press for the cooling step, the applied pressure presently preferred is approximately 700 psi (49.215 Kg/cm$^2$) on the material. With the press presently employed this has been attained with a constant gauge pressure of 300 psig (21.092 Kg/cm$^2$ gauge). However, in known manner, the gauge pressure will vary relative to the material pressure depending upon the geometry of the various parts involved. It is believed that satisfactory results during cooling will be obtained using pressure on the material within the range of 630 to 770 psi (44.294 to 54.137 Kg/cm$^2$).

As soon as pressure has been reestablished in the press, compressed air supply and exhaust lines are connected to the nipple fittings 40 and 41 to pass air through channel 37 and cool the flared plastic overlying the stack flange 33. Next, air may be injected through openings in the base plate 43 by means, not shown, into the interior of the stack core 31 to cool the stack area. This is followed by blowing air through the hollow core sections 17 and 20 to cool the flared ends of the liner overlying the flanges 19 and 28 and the straight run of the mold. Fans or the like can be used for this purpose. As mentioned above, the objective is to cool the material from the remotest point of the mold back toward the gate in a progressive manner such that voids may be avoided by flow of additional material in from the chamber 56 as required.

When the temperature of the mold has been brought down significantly below the melting point of the resin, for example to the neighborhood of 300° F. (148.89° C.), the assembly may be removed from the press and disassembled. It will be understood that in the process of disassembling the unit the split adaptor ring 54 can be opened and removed exposing a short section of sprue between die 55 and bushing 15 that can be severed. Then, after the tee mold is removed from the fixture, the bushing 15 can be removed and the sprue stub sliced flush with the outer surface of the tee fitting. Then a standard pipe plug is introduced as described previously.

After the cores are removed from the fitting, the diaphragm formed over the bottom of the stack core 34 is carefully excised. The molding procedure is now completed.

Except as specifically noted hereinafter, the same procedure described above has been applied successfully to line a 6" tee fitting with polypropylene and polyvinylidene fluoride resins. The polypropylene resin used was Pro-Fax 7824, a propylene co-polymer produced by Hercules Incorporated, Wilmington, Delaware. The resin and mold temperature found satisfactory for this material lies within the range of 350° to 390° F. (176.67° to 198.89° C.) with 365° to 385° F. (185.00° to 196.11° C.) preferred. The polyvinylidene fluoride resin used was Kynar 820 produced by Pennwalt Corporation, Fluorochemical Division, Philadelphia, Pennsylvania. The resin and mold temperature found satisfactory for this last mentioned material lies within the range of 430° to 480° F. (221.11° to 248.89° C.) with 440° to 460° F. (226.67° to 237.78° C.) preferred. Identical transfer and cooling pressures as well as cooling procedures were employed with these materials as was set forth above for processing FEP and PFA resin.

In conclusion, the foregoing process as a result of the use of low pressure and slow transfer which is permitted by the isothermal procedure, yields products that are free from melt fractures. A concomitant advantage of the use of low pressures is the ability to use relatively low capacity and inexpensive presses and actuators. Because the resin is transferred isothermally, the time it takes to transfer from the charge chamber or pot to the mold is not critical and there no longer is a need to race against time to fill the mold before it cools excessively.

It will be understood that a cull section remains in the die 55 at the termination of the molding operation and this cull section can be chopped up and reused by virtue of the melting procedure described previously.

Having described the best mode presently known for practicing the subject invention, it should be understood that various changes in detail may be effected without departing from the true spirit of the invention as defined in the appended claims.

What is claimed is:

1. The process of producing an article by transfer molding a thermoplastic material selected from the group consisting of fluoroethylene propylene (FEP), perfluoroalkoxy (PFA), polyvinylidene fluoride, and polypropylene resins, wherein said material in a heated condition is transferred by the application of pressure thereto from a charge holding chamber to an interconnected mold, characterised in that heat is applied to said chamber and said mold so as to maintain both at the same substantially constant temperature above the melting point of said material while said material in a melt state is transferred from said chamber to said mold under a transfer pressure on the material within the range of 190 to 230 psi (13.359 to 16.171 Kg/cm$^2$).

2. The process of producing an article by transfer molding a thermoplastic material selected for the group consisting of fluoroethylene propylene (FEP), perfluoroalkoxy (PFA), polyvinylidene fluoride, and polypropylene resins, wherein said material in a heated condition is transferred by the application of pressure thereto from a charge holding chamber to an interconnected mold, characterized in that heat is applied to said chamber and said mold so as to maintain both at the same substantially constant temperature above the melting point of said material while said material in a melt state is transferred from said chamber to said mold under a transfer pressure on the material within the range of 190 to 230 psi (13.359 to 16.171 Kg/cm$^2$), said pressure being maintained constant and the feed monitored until no longer detectable, whereupon said pressure is removed, the application of said heat is interrupted and said chamber and mold are transferred to a cooling station where pressure is reapplied to the material remaining in said chamber within the range of 630 to 770 psi (44.294 to 54.137 Kg/cm²), and thereafter coolant is progressively applied to said mold to cause said material to freeze progressively from the remotest point back toward the gate.

* * * * *